US007012602B2

(12) United States Patent
Watson et al.

(10) Patent No.: US 7,012,602 B2
(45) Date of Patent: Mar. 14, 2006

(54) VIRTUAL THREE-DIMENSIONAL DISPLAY FOR PRODUCT DEVELOPMENT

(75) Inventors: Ronald S. Watson, Los Gatos, CA (US); Humberto E. Roa, San Jose, CA (US); Vamsee K. Tirukkala, San Jose, CA (US); Christopher K. Groves, Los Gatos, CA (US); Manoharan Amuthukkiniyavel, Tamil Nadu (IN); Timothy M. Askins, Mesa, AZ (US)

(73) Assignee: Centric Software, Inc., San Jose, CA (US)

( * ) Notice: Subject to any disclaimer, the term of this patent is extended or adjusted under 35 U.S.C. 154(b) by 200 days.

(21) Appl. No.: 10/100,288

(22) Filed: Mar. 14, 2002

(65) Prior Publication Data

US 2003/0179248 A1 Sep. 25, 2003

(51) Int. Cl.
*G06T 15/00* (2006.01)

(52) U.S. Cl. .................. 345/419; 707/10; 715/751; 715/755; 715/757; 715/763; 715/848

(58) Field of Classification Search ............... 345/419, 345/848; 707/10, 104.1; 715/751, 755, 715/757, 763, 848
See application file for complete search history.

(56) References Cited

U.S. PATENT DOCUMENTS 6,230,116 B1    5/2001  Ronen et al.
6,346,956 B1 *  2/2002  Matsuda ................ 345/848

FOREIGN PATENT DOCUMENTS

EP    0 779 574    *  6/1997
EP    0 843 168    *  5/1998

OTHER PUBLICATIONS

Sarin et al. "A Process Model and System for Supporting Collaborative Work", ACM 1991, pp. 213-224.*
Microsoft Task Gallery at <<http://research.microsoft.com/ui/TaskGallery/index.htm>> visited on Apr. 5, 2002. pp. 1-3.
Win3D at <<http://www.clockwise3d.com/products/products.html>> visited on Apr. 5, 2002. pp. 1-2.
European Search Report mailed Oct. 15, 2004 for European patent application No. 03251499.4, 3 pages.*

* cited by examiner

Primary Examiner—Kimbinh T. Nguyen
(74) Attorney, Agent, or Firm—Beyer Weaver & Thomas LLP

(57) ABSTRACT

A method is provided to represent a product development to a plurality of users. The product development comprises a collection of heterogeneous product development data elements manipulable by a plurality of heterogeneous application processes. A rendered three-dimensional virtual room is displayed to the user. The virtual room includes a plurality of walls. The displaying step includes displaying iconic images on the walls. The iconic images correspond to at least some of the product development elements with the visual organization of the displayed iconic images corresponding to a desired visual organization of the product development. Selection input is accepted from the users to select the iconic images and an indication of the input is provided to appropriate ones of the application processes to access and manipulate the product development elements to which the iconic images correspond.

14 Claims, 16 Drawing Sheets

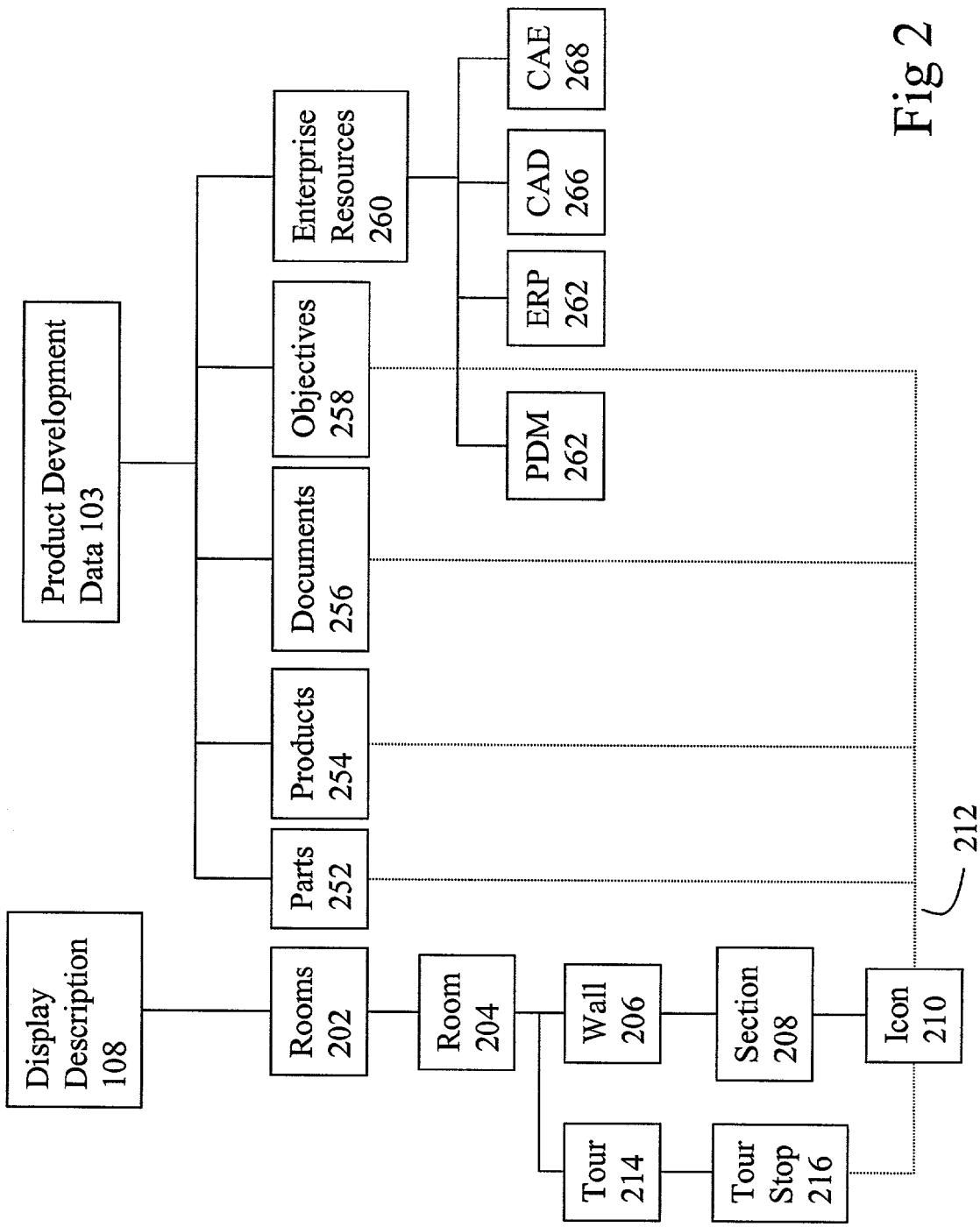

VIRTUAL THREE-DIMENSIONAL DISPLAY FOR PRODUCT DEVELOPMENT

TECHNICAL FIELD

The present application is in the field of collaboration for product development and, in particular, is directed to managing and presenting product development data in a virtual three-dimensional manner, analogous to a commonly-used "war room" in the physical world.

BACKGROUND

The use of a physical "war room" for collaborating on product development is known. In particular, product development collaborators typically gather in a physical room, fastening documents embodying various aspects of the product development to the walls of the physical room. There are some disadvantages to using a physical room for such collaboration, however. First, nowadays, product development collaborators are typically spread out geographically, throughout the country or even throughout the world. In addition, since much of the product development data is electronic, it is cumbersome to collaborate in a physical room with respect to such electronic product development data.

What is desired is a mechanism that facilitates cooperation among product development collaborators who may be geographically dispersed, with respect to product development data that is in electronic form.

SUMMARY

A method is provided to represent a product development to a plurality of users. The product development comprises a collection of heterogeneous product development data elements manipulable by a plurality of heterogeneous application processes. A rendered three-dimensional virtual room is displayed to the user. The virtual room includes a plurality of walls. The displaying step includes displaying iconic images on the walls. The iconic images correspond to at least some of the product development elements with the visual organization of the displayed iconic images corresponding to a desired visual organization of the product development. Selection input is accepted from the users to select the iconic images and an indication of the input is provided to appropriate ones of the application processes to access and manipulate the product development elements to which the iconic images correspond.

BRIEF DESCRIPTION OF FIGURES

FIG. 1 illustrates the interaction of product development data, user input, and rendering functionality of which the architecture of the FIG. 1—1 embodiment is comprised.

FIG. 2 illustrates a hierarchical arrangement of display descriptor data and product development within the FIG. 1—1 embodiment.

FIG. 11A focuses on the specification of tour "stops", while FIG. 11B highlights the use of the "tour stop sorter" to edit the order of the tour stops.

DETAILED DESCRIPTION

Figure 1:
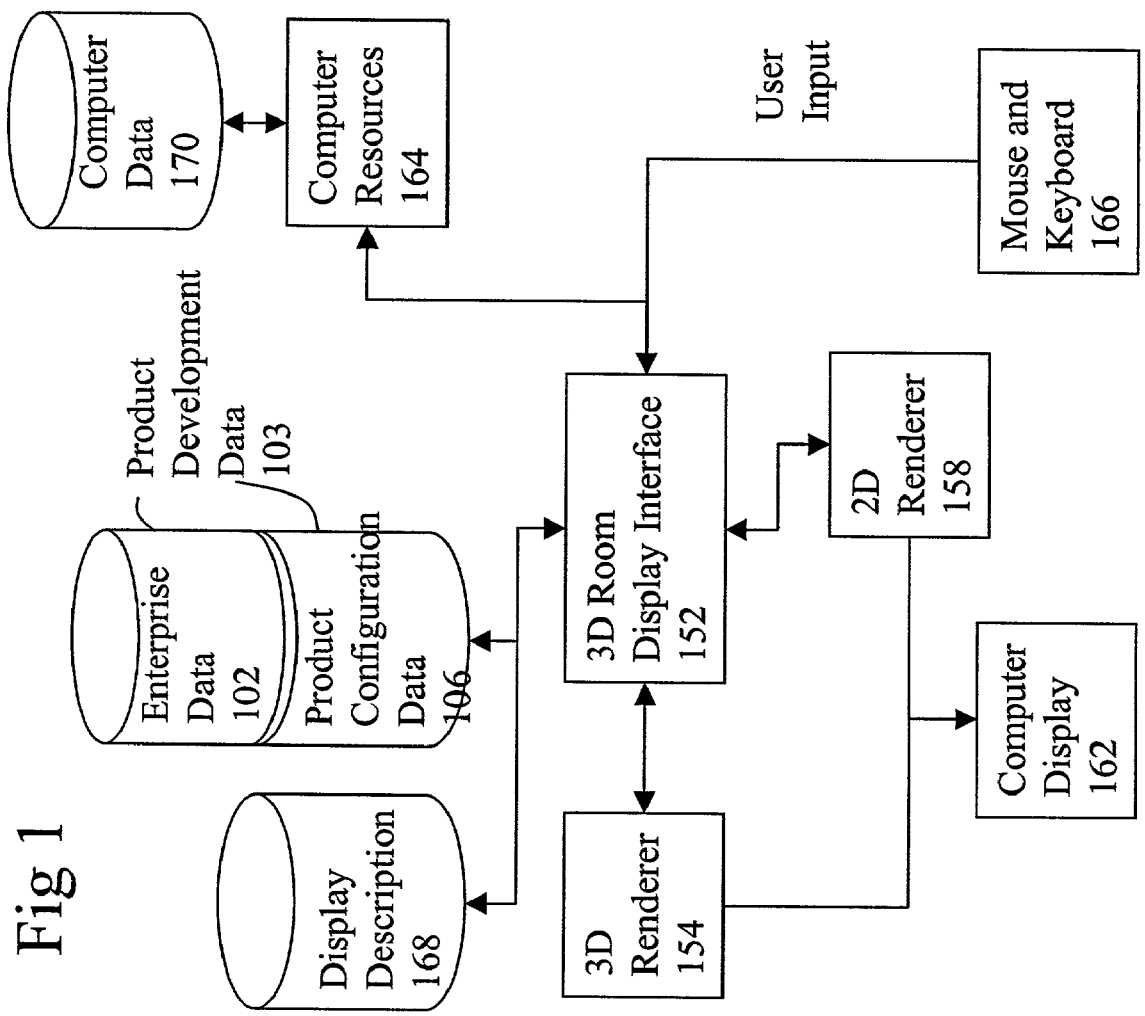
FIG. 1—1 is a simplified functional block diagram of a virtual room product development collaboration system in accordance with an embodiment of the present invention.
Figure 1:
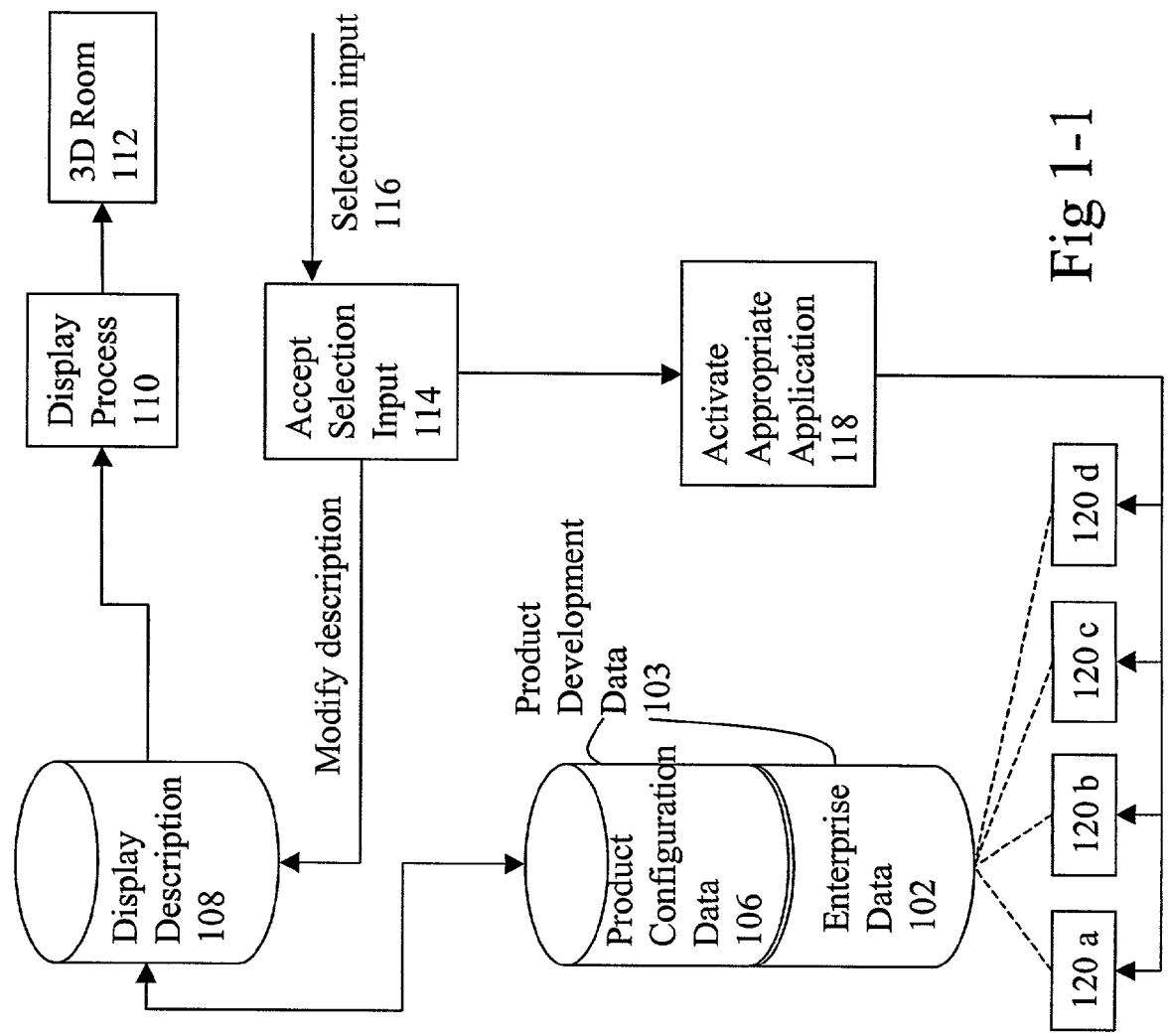

FIG. 1—1 is a combined data flow and process flow diagram that illustrates one broad aspect of the invention. Turning now to FIG. 1—1, a product development data store 103 is provided. The product development data store 103 holds data that defines a product under development—product development elements. In the particular embodiment illustrated in FIG. 1—1, the product development data logically includes enterprise data 102 and product configuration data 106. Enterprise data may be, for example, data generally directed to parts of a product while product configuration data may be, for example, data generally directed to how the parts of the product are interrelated. Other logical configurations of the product development data store 103 are employed in other embodiments. Furthermore, while FIG. 1—1 illustrates the product development data store 103 as being a single data store, the product development data store 103 may be distributed, and the product development element data are not necessarily stored in a cohesive manner.

A display description data store 108 is also provided. A display process 110 utilizes the display description data 108 to generate a display 112 of a three-dimensional room ("virtual room"). Particular embodiments of the three-dimensional room display 112 are described later. Broadly speaking, however, the virtual room 112 includes a plurality of walls. Iconic images are displayed on the walls. The iconic images correspond to at least some of the product development elements in the product development data store 103. The visual organization of the displayed iconic images correspond to a desired organization of the product development as defined by the display description store 108. Furthermore, in accordance with some embodiments, a graphical or textual indication is superimposed over the icon to indicate properties of the product development data element corresponding to the icon. For example, such a superimposed indication can indicate whether a user has permission to access a computer file holding the product development data element. An image of a lock, either latched or unlocked, is one possible graphical indication in this example. Additionally, various status information of a product development element could be indicated in this manner, including such information as degree of completion, urgency, and quality.

A selection input accept process 114 accepts selection input 116 from a user. Based on the selection input 116, the selection input accept process 114 modifies the display description data in the display description store 108. Besides resulting in modification to the appearance of the virtual room, this may also result in modification to the users' vantage point to the virtual room. In addition, based on the selection input 116, the selection input accept process 114 may cause an activate application process 118 to activate an appropriate application process 120 to access the product development element data in the product development data store 103.

Since the iconic images on the walls of the virtual room 112 are links to the product development data elements in the product development data store 103, the product development data elements are not "frozen" once placed on a wall. Rather, the product development data elements themselves are dynamic, reflecting alterations made to the product development data elements since icons representing them are "posted" on the wall. Put another way, the data references are "alive," in the sense that each references actual working data, rather than a static snapshot of it.

A product development data element represented on a wall is potentially of unlimited complexity. There is no difficulty "fitting" even a large data object on the wall (unlike in a physical war room). Since the representation on the wall is a dynamic link to an actual product development data element in the product development data store 103

A product development data element represented on a wall can be accessed directly for viewing and editing in an appropriate application, even the native application used (and, mostly likely, well-suited) to create and manipulate it. In a physical war room, individuals typically add changes to the physical documents on the walls and then integrate the changes into the electronic sources at a later time. Alternatively, even with the physical war room, an individual may immediately refer back to an electronic source and make the edits to the electronic source. This, however, takes the user out of the experience of using the physical war room as the primary representation. Additionally, the changes to the electronic source are not reflected on the data posted on the wall. In accordance with embodiments of the invention, the viewing of referenced product development data elements is an integrated experience. Electronic source product development data is accessed directly from the virtual room, allowing changes made while "in the room" to be immediately implemented in the product development data store 103.

A product development data element is represented on a wall of the virtual room 112 succinctly by a graphical image (as defined, for example, in the display description data store 108 and/or the product development metadata store 106), allowing pertinent elements of the data to stand out at a glance. Additionally, the representation can be changed to improve its impact, alter its focus, or reflect recent changes to the data. In contrast, data posted on the actual walls of a physical war room must often be examined closely to determine the content. The title page of a physical document may contain enough information to give some idea about its relevant content, but it cannot be easily altered. Furthermore, data best represented by an image may include a physical drawing or image, but this cannot be easily updated to reflect the latest state of the data.

FIG. 1 illustrates, in a simplified manner, an architecture in which the FIG. 1—1 aspect may be embodied. A 3D renderer 154 generates a three-dimensional display 162 (e.g., element 112 of FIG. 1—1) based on the product development data 103 with reference to the display description store 108. In addition, user input may be provided from a user input device 166 (such as a mouse and/or keyboard) to modify the display description data store 108, to access (using computer resources 164) particular product development elements referenced by the display 162 or to modify the display to allow users to "navigate" through the virtual room.

FIG. 2 illustrates a particular embodiment of the display description data store 108 and product development metadata store 106. In the FIG. 2 embodiment, the display description data store 106 is organized in a hierarchical manner. Element 202 represents how the rooms are collectively organized for display, while element 204 represents how a particular room is organized for display. In accordance with one embodiment, a "room" node also has various non-organizational properties that can be altered to customize the overall appearance of the room. Similarly, each "wall" node has adjustable properties that determine its appearance, size, and placement.

Element 206 represents how a wall of a room is organized for display, while element 208 represents how a section of a wall is organized for display. Finally, element 210 represents an icon on a section of the wall. Each data reference represented by an icon also has properties affecting the appearance, size, and placement of the iconic representation of the reference upon the appropriate wall. FIG. 2 illustrates an example embodiment, and there are other embodiments that fall within the scope of aspects of the invention.

The dotted indication 212 from the icon representation 210 to the various product development data elements in the product development data store 102 indicate, referring back to FIG. 1—1, links from the display description 108 to the product development data store 102. In the FIG. 2 embodiment, the various product development data elements are parts 252, products 254, documents 256, and objectives 258. Enterprise resources 260 are also provided. Examples of enterprise resources are product data management 262 (PDM), enterprise resource planning 264 (ERP), computer-aided design 266 (CAD) and computer-aided engineering 268 (CAE). These enterprise resources 260 are examples of the application programs 120 shown in FIG. 1—1.

Figure 3A:
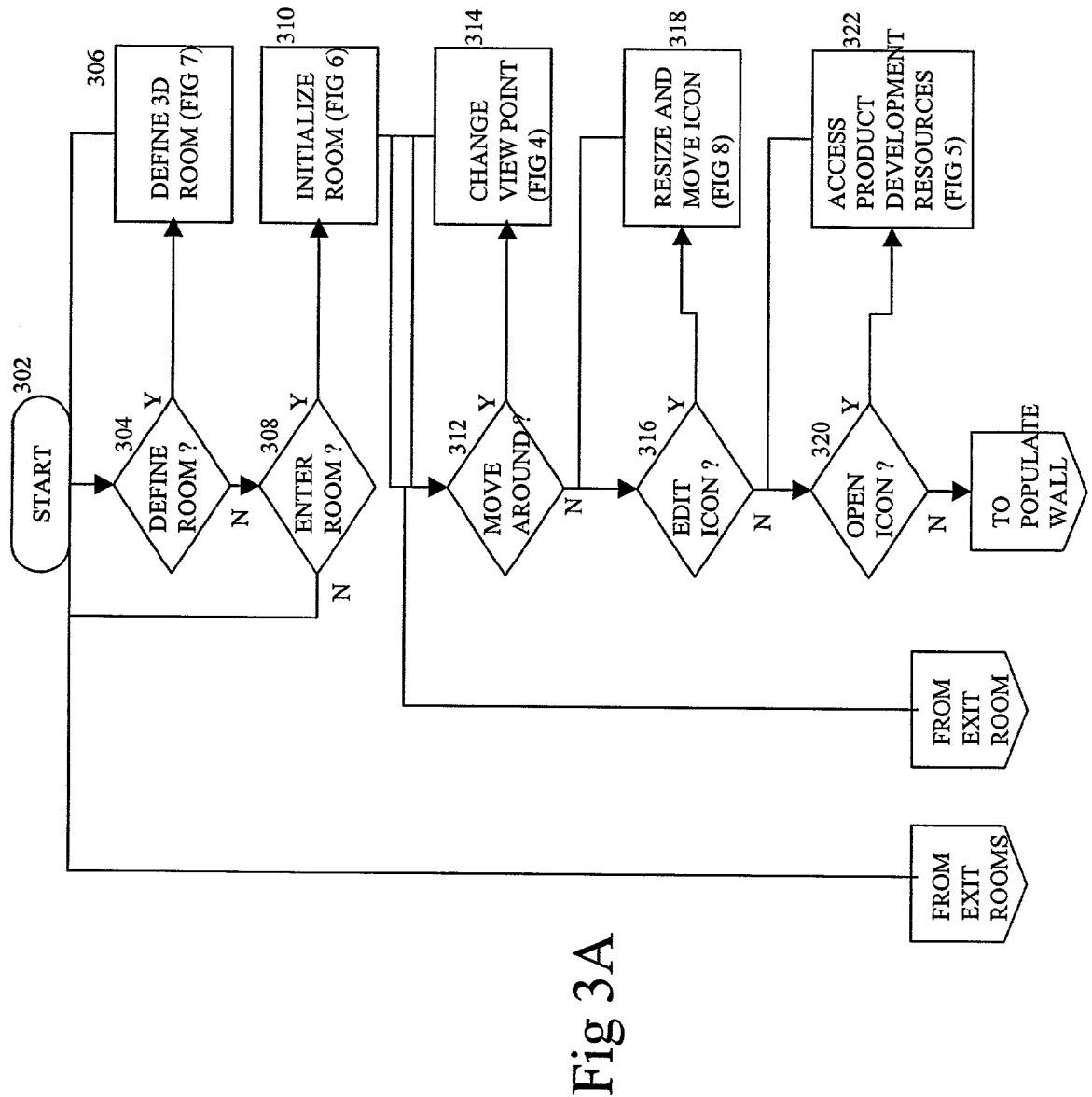
FIGS. 3A and 3B, taken together, illustrate various actions that can be performed to create, populate, and interact with a virtual room.
Figure 3B:
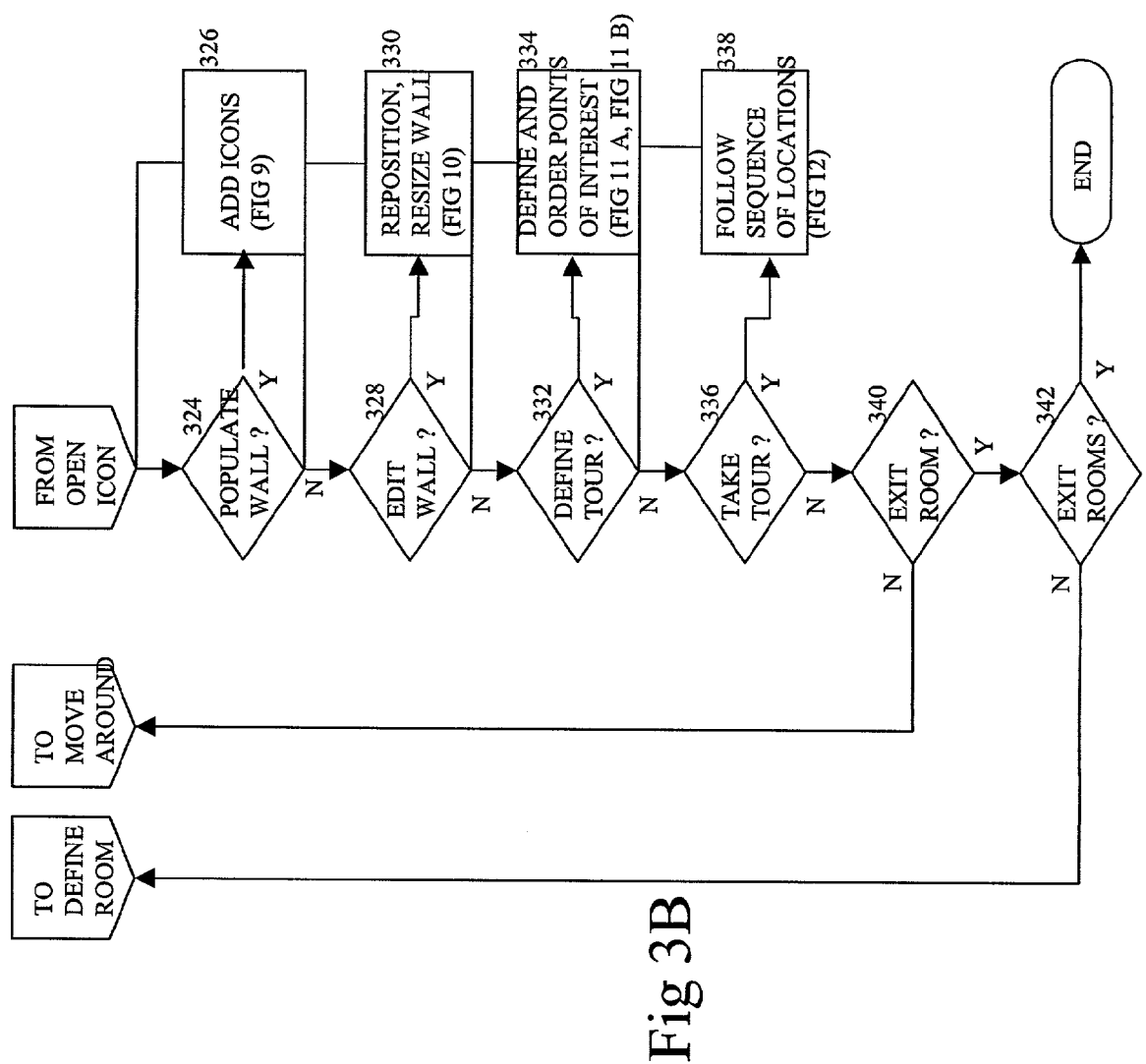

FIGS. 3A and 3B illustrate, in accordance with an embodiment, how the display description data store 108 is populated and processed to define and/or navigate a virtual room. First, a virtual room is defined by, if desired (step 304) creating a "room" node 204 (step 306) within the FIG. 2 display description data store 108. Then, if it is desired to enter the room (step 308), the room is initialized (step 310), and the user views the room from a vantage point that is initially set to a default viewpoint. If it is desired to "move around" the room (step 312), then the viewpoint is changed (step 314). Otherwise, if it is desired to edit an icon (step 316), the icon is moved and/or resized (step 318). If it is desired to access the product development data element represented by an icon (step 320), then the product development data element is accessed (step 322).

In general, "wall" nodes are treated as children of "room" nodes in the display description data store 108. The walls can ultimately be populated with pointers to product development data elements. If it desired to populate a wall (step 324), then icons are added to the wall (step 326). An icon is treated as a child node of the "wall" node. If it desired to change the appearance of the wall (step 328), then the wall is repositioned or resized (step 330). If it desired to define a tour (step 332) through the virtual room, then the points of interest ("tour stops") are defined and ordered (step 334). If it desired to take a tour (step 336), then the tour stops are followed (step 338). If it desired to exit a room (step 340) or to exit all the rooms (step 342) then processing continues at step 312 or step 304, respectively.

Multiple rooms can also be connected together. This is accomplished by indicating a "room" node of one wall to a "wall" node of another room node. This results in a "portal" node being created as a child of the "wall" node of the other room. The portal is represented as an image on the wall (optionally, appearing as a door). If the user selects the portal icon within a virtual room, the referenced virtual room is displayed as a result.

In accordance with some embodiments, in addition to the virtual room visualization of the product development data, a hierarchical "tree view" of the product development data, consistent with the virtual room visualization, is also provided. Users can interact with the display description data store 108 and the product development data store 103 via either the virtual room or the tree view.

Figure 4:
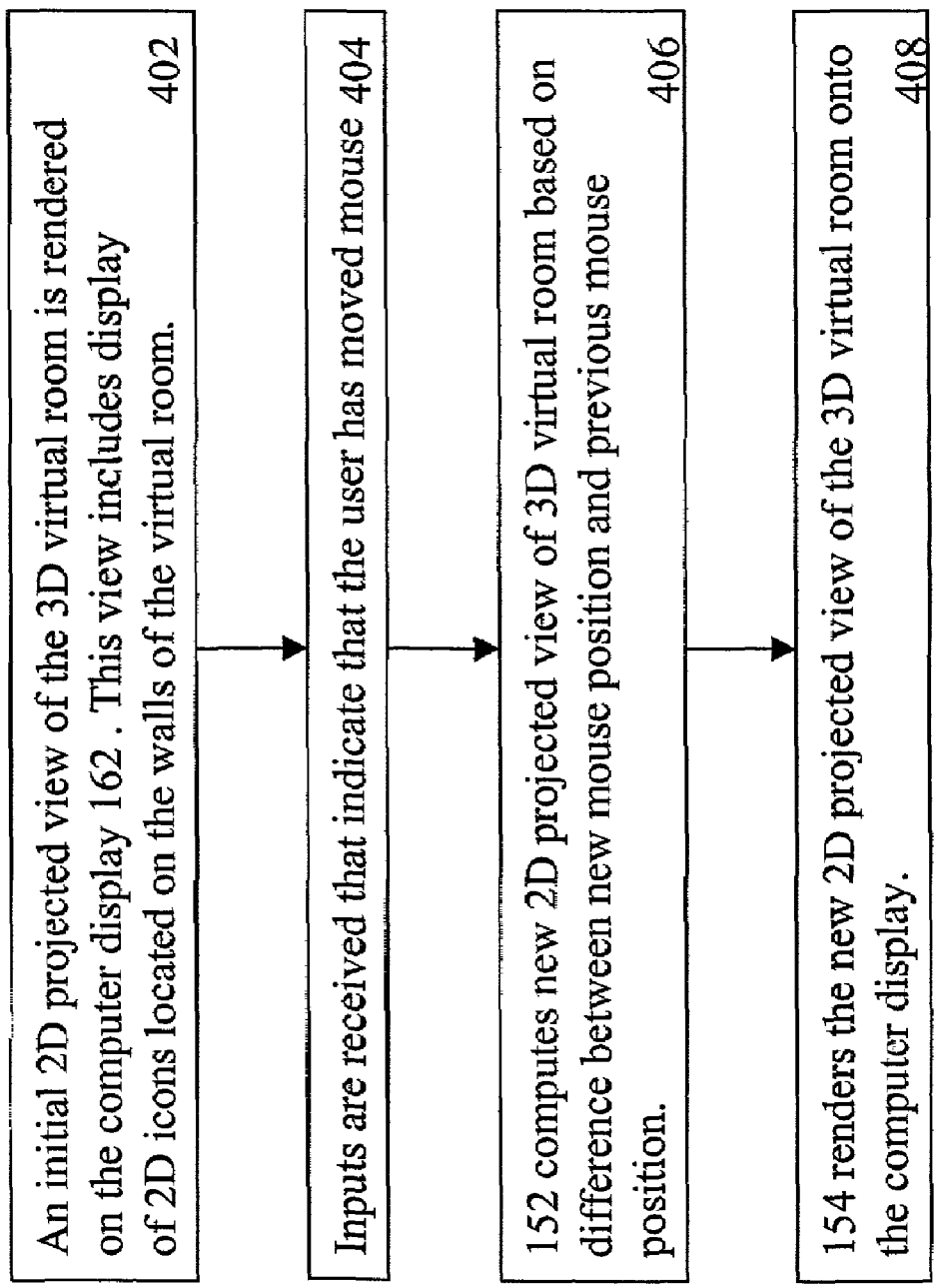
FIG. 4 is a simplified flowchart illustrating one manner in which user input is used to move the vantage point about the virtual room (step 314 in FIG. 3A).

FIG. 4 illustrates an example embodiment of step 314 of FIG. 3, to change the displayed view point. At step 402, an initial two-dimensional projected view of the three-dimensional virtual room is rendered. This two-dimensional view includes a display of two-dimensional icons on the walls of the virtual room. When an input has been received that the user has moved the mouse (step 404) to indicate a desired view point change, a new two-dimensional projected view is computed (step 406). Then the new two-dimensional projected view is displayed (step 408). Movement through a virtual room may be in a free form manner, or in a semi-automated manner. In the free-form manner, mouse movements are mapped directly to changes to the viewer's vantage point. In the semi-automated manner, the viewer uses the mouse to select a wall or a data icon, and the vantage point is automatically changed to produce a clear view of the selected item (e.g., viewed perpendicularly, filling most of the view window). The automated relocation of the vantage point is accomplished in some embodiments through a series of interpolated vantage points over a brief period of time, resulting in what appears to be an "animated fly-to" so that the user can retain visual orientation within the virtual room.

Figure 5:
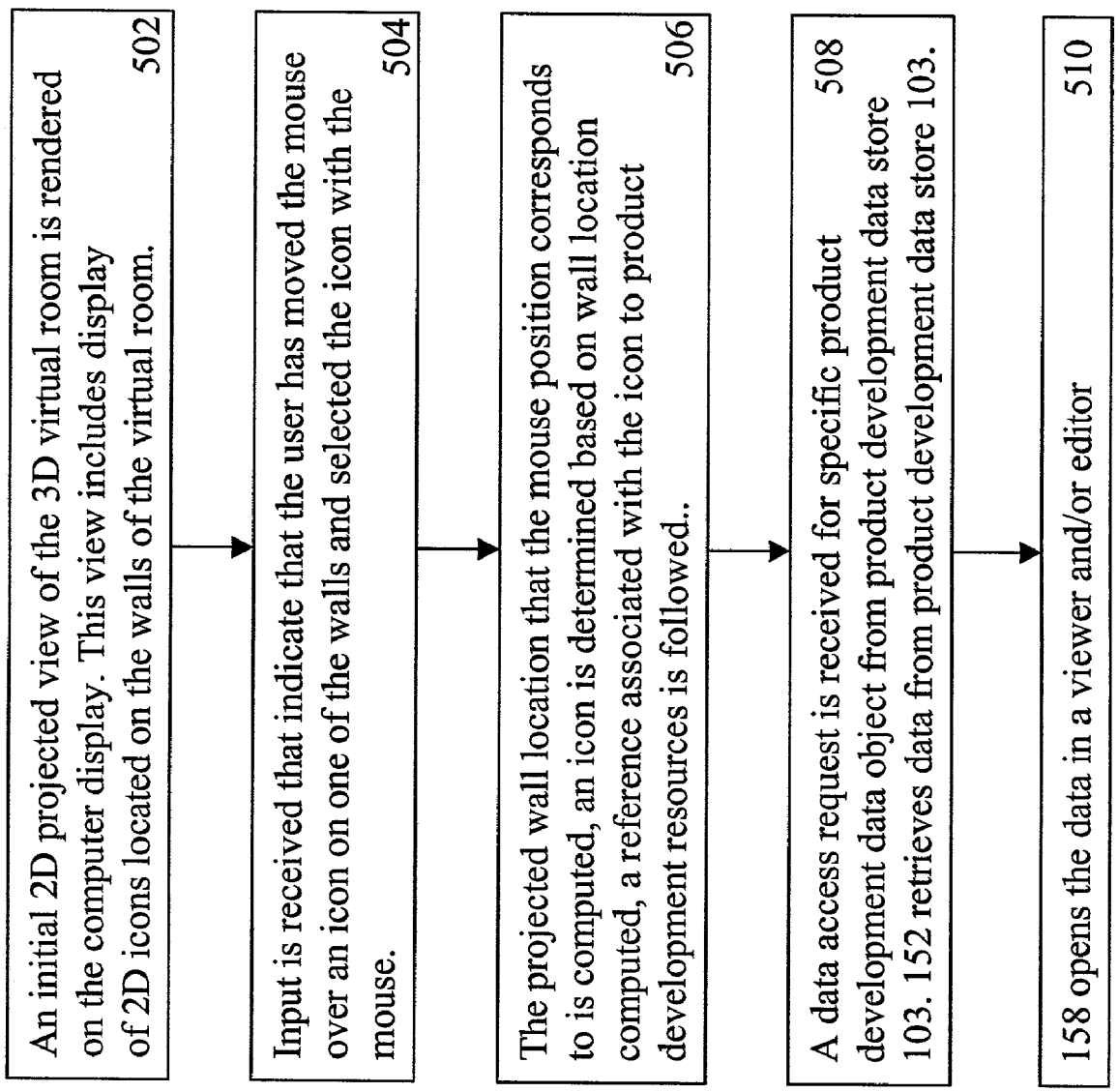
FIG. 5 is a simplified flowchart illustrating a manner in which a virtual room can be used to access a referenced product development data element (step 322 in FIG. 3A).

FIG. 5 illustrates an example embodiment of step 322 of FIG. 3, to access an underlying product development data element via the virtual room. At step 502, an initial two-dimensional projected view of the three-dimensional virtual room is rendered. This view includes a display of two-dimensional icons located on the walls of the virtual room. At step 504, input is received indicating the user has selected an icon. At step 506, information about the product development data element represented by the icon is retrieved from the display description data store 103. At step 508, the project development data element referenced by the icon is retrieved (e.g., from the product development data store 103 in FIG. 1—1 and FIG. 1). At step 510, an appropriate application program 120 is employed to view and/or edit the retrieved product development data element.

In some embodiments, a default icon is initially assigned to represent a product development data element based upon the type of data being referenced. The user can change the property of the display description data corresponding to the product development data element to indicate that a different icon is to be utilized for the product development data element. The user can also open the referenced product development data element in its own viewer/editor and cause a new image for the icon to be assigned upon closing the viewer. A snapshot is taken, and the icon associated with the product development data element is updated to that snapshot.

Figure 6:
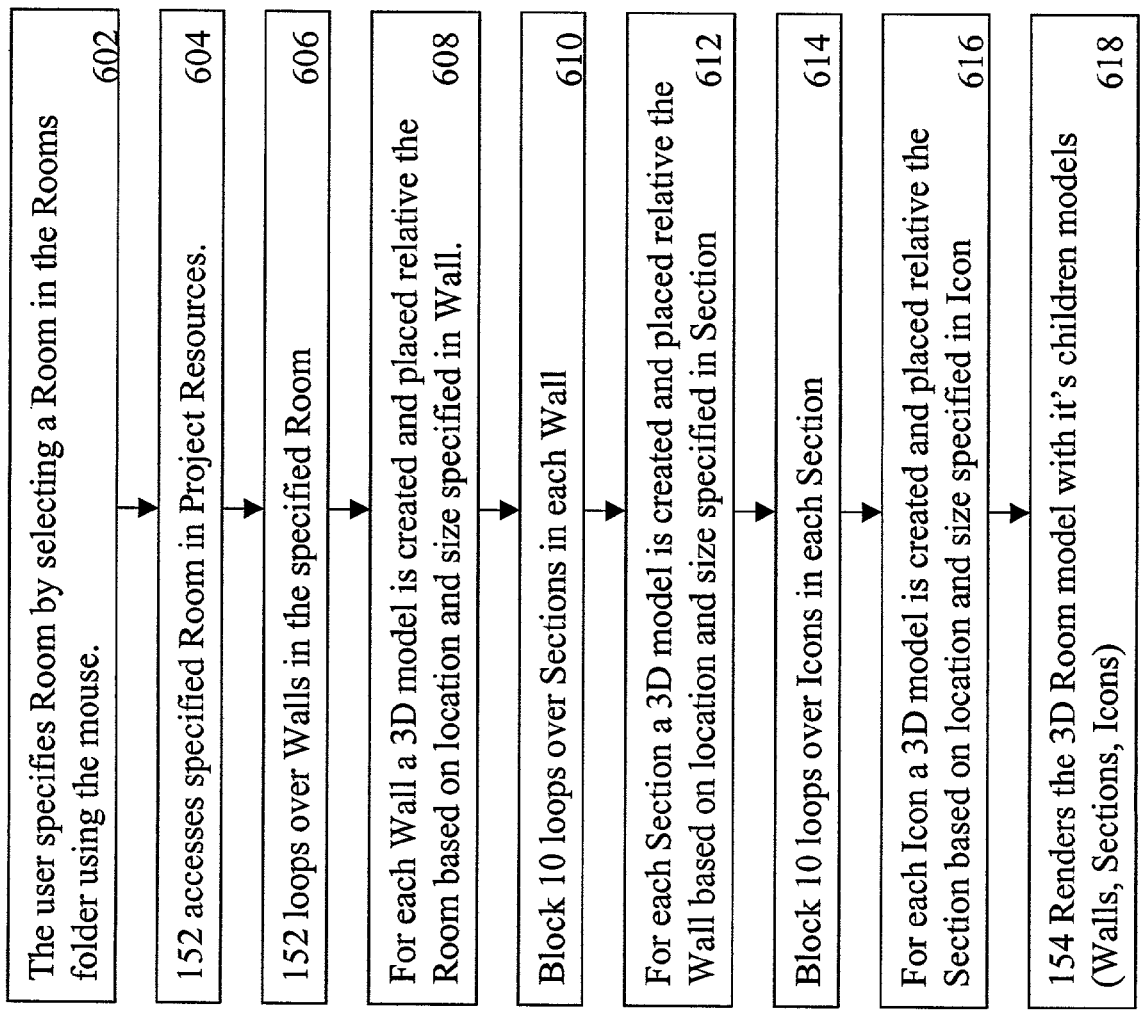
FIG. 6 is a simplified flowchart illustrating a process used to generate a three-dimensional display model from a room description tree (step 310 in FIG. 3A).

FIG. 6 illustrates an example embodiment of step 310 of FIG. 3, to initialize a room. At step 602, the user accesses a rooms folder (element 202 in FIG. 2) and specifies the particular room 204 to be initialized. At steps 606 and 608, a three-dimensional model is created for each wall and associated with the room based on the specified location and size of that wall. At steps 610 and 612, a three-dimensional model is created for each section of the wall and associated with the wall based on the specified location and size of that section. At steps 614 and 616, a three-dimensional model is created for each icon of the section and associated with the section based on the location and size of the icon. At step 618, the three-dimensional room model is rendered based on the three-dimensional models created for the walls, sections and icons.

Figure 7:
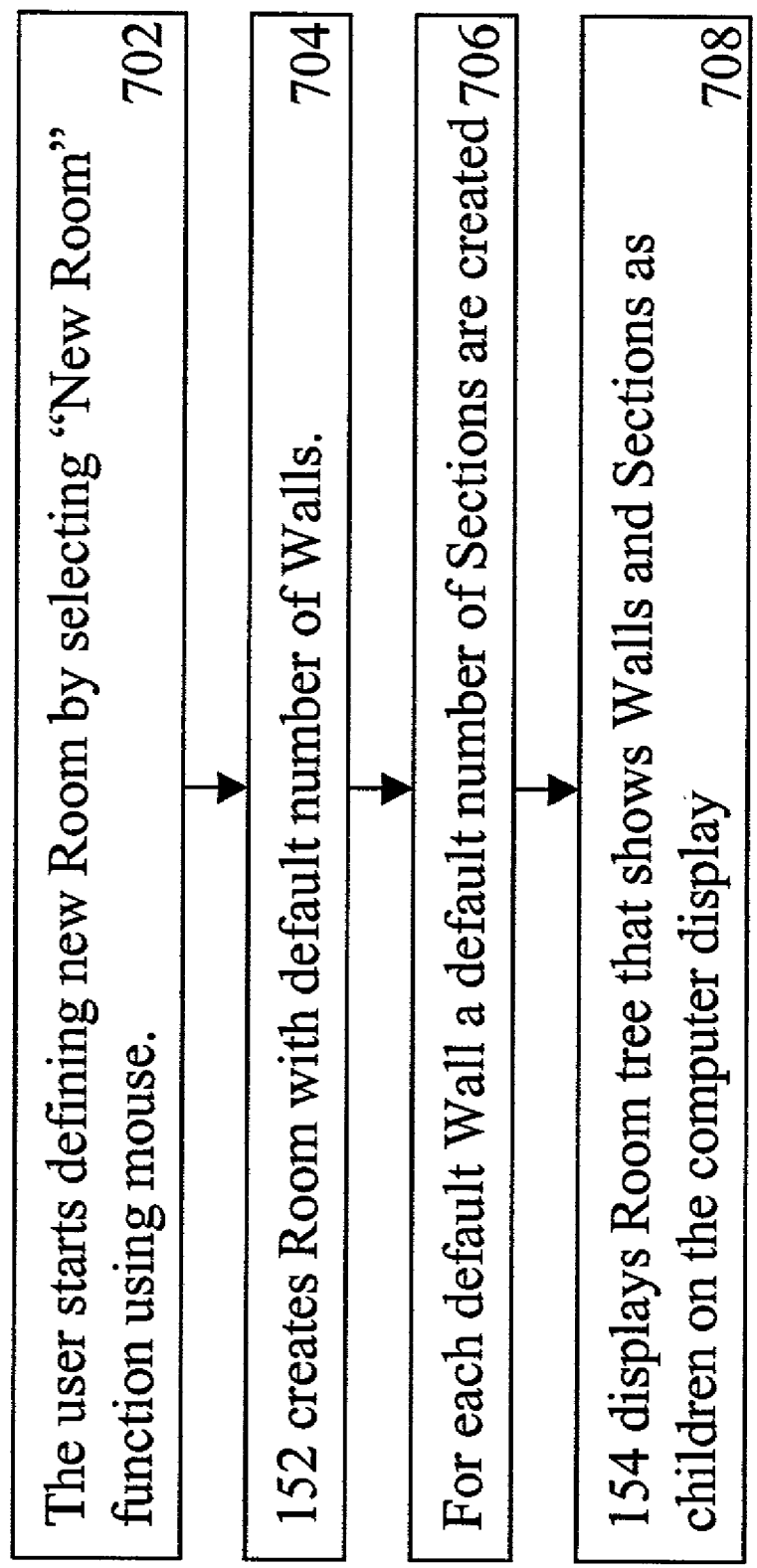
FIG. 7 is a simplified flowchart illustrating a process used to define a virtual room (step 306 in FIG. 3A).

FIG. 7 illustrates an example of initially defining a virtual room. At step 702, a user selects a "new room" function using the mouse. At step 704, a room is created with a default number of walls. At step 705, a default number of sections is created for each wall. At step 708, the room (with walls and sections) is represented in a hierarchical manner (e.g., in a "tree" fashion).

Figure 8:
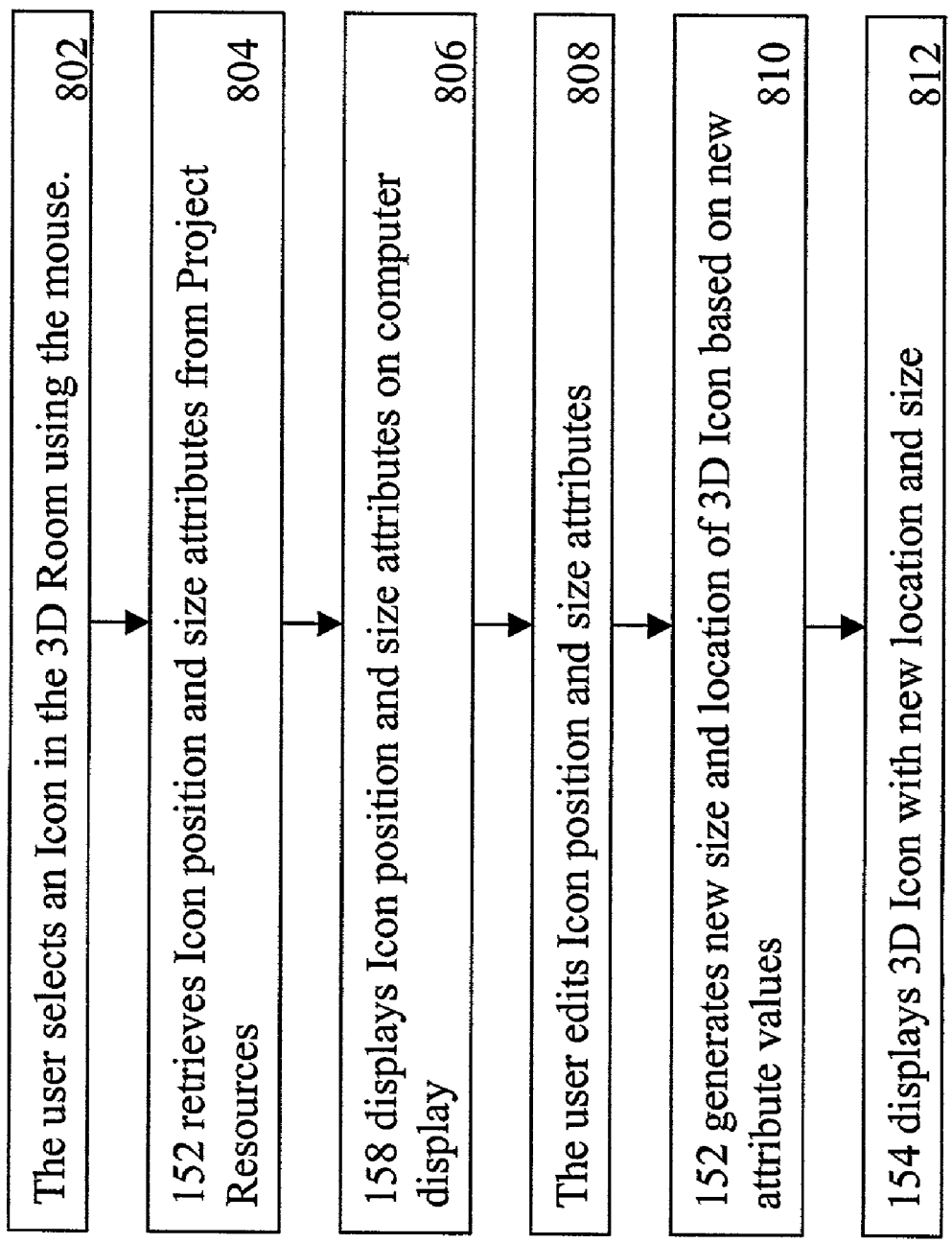
FIG. 8 is a simplified flowchart illustrating a manner in which the size and location of an icon on a wall within the three-dimensional room model may be edited (step 318 in FIG. 3A).

FIG. 8 illustrates an example embodiment of step 318 of FIG. 3, to resize and move an icon. At step 802, the user selects an icon in the three-dimensional virtual room. At step 804, the icon position and size attributes are received from the display description data store 108 (FIG. 1—1). At step 806, the icon position and size attributes are displayed and, at step 808, the user edits the icon position and size attributes. At step 810, the three-dimensional model for the icon is modified based on the new icon position and size attributes. Finally, at step 812, the icon is displayed according to the modified three-dimensional model.

Figure 9:
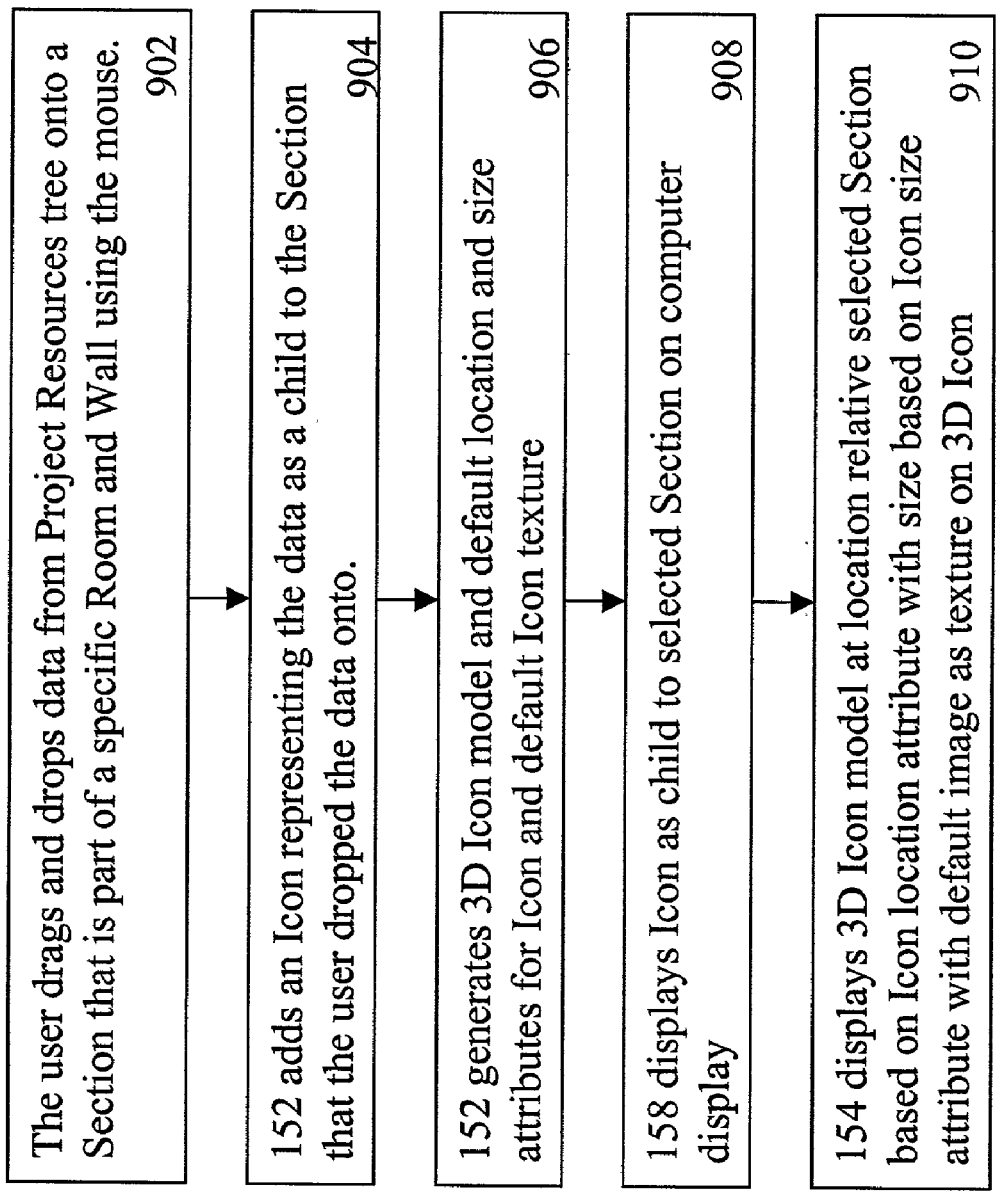
FIG. 9 is a simplified flowchart illustrating how data references are added to the walls of a three-dimensional room in accordance with an embodiment (step 326 in FIG. 3B).

FIG. 9 illustrates an example embodiment of step 326 of FIG. 3, to add icons. At step 902, the user drags and drops an indication of a product development data element from a hierarchical representation of the product development data store onto a section. An icon is added at step 904, representing the product development data as a child to that section. At step 906, a three-dimensional icon model is generated, having a default icon size, location and texture. At step 908, an indication of the icon is added to the project resources tree. At step 910, the icon is rendered in the virtual room according to the three-dimensional icon model.

Figure 10:
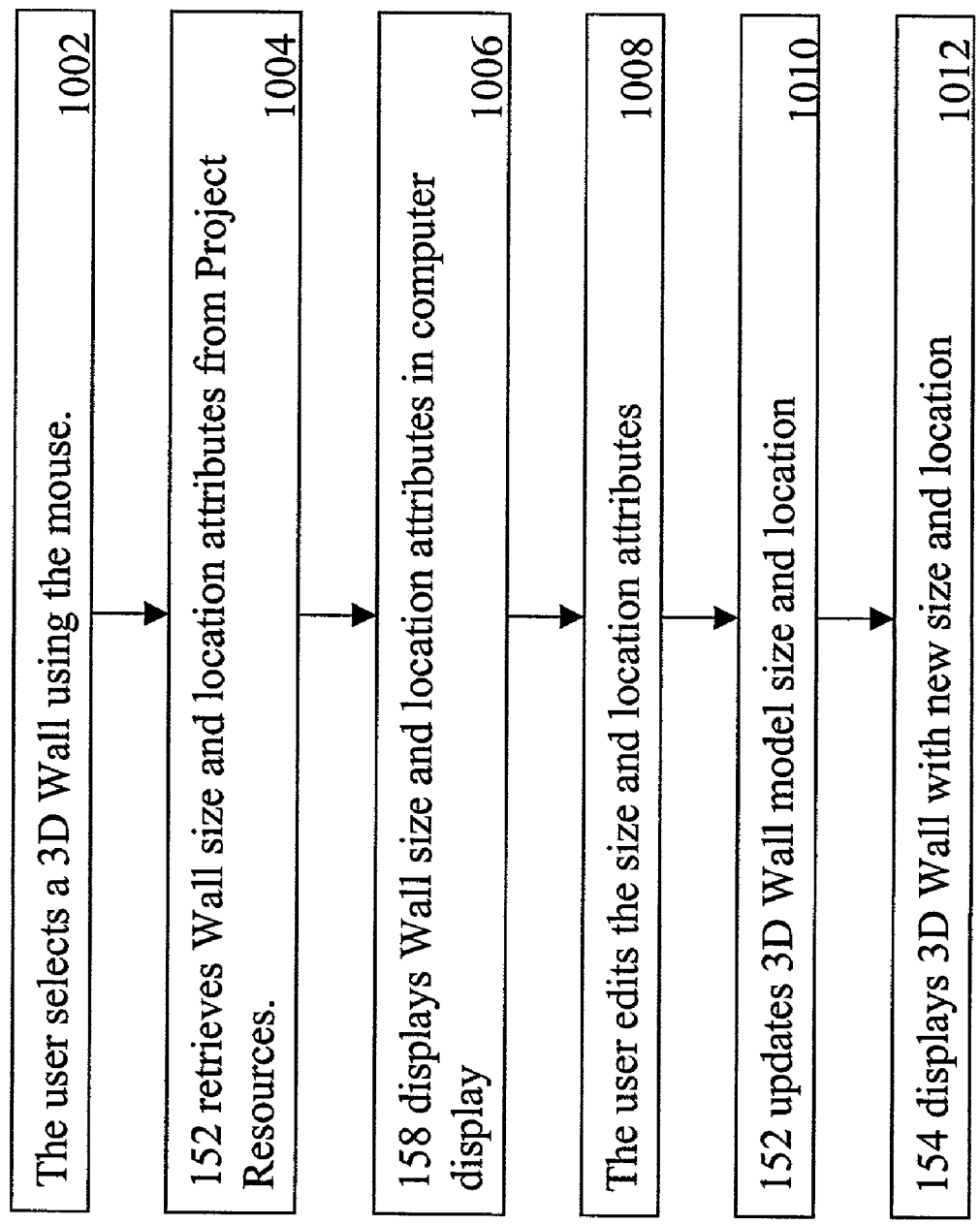
FIG. 10 is a simplified flowchart illustrating a manner in which the size and location of a wall within a three-dimensional room are edited in accordance with an embodiment (step 330 in FIG. 3B).

FIG. 10 illustrates an example embodiment of step 330 of FIG. 3, to reposition and resize a wall. At step 1002, the user selects a wall using the mouse. At step 1004, the wall size and location attributes are retrieved from the project resources tree. At step 1006, the wall position and size attributes are displayed and, at step 1008, the user edits the wall position and size attributes. In accordance with some embodiments, the user employs a two-dimensional map of the room to indicate desired changes in a simpler manner. At step 1010, the three-dimensional model for the wall is modified based on the new wall position and size attributes. At step 1012, the wall is displayed according to the modified three-dimensional model.

Figure 11:
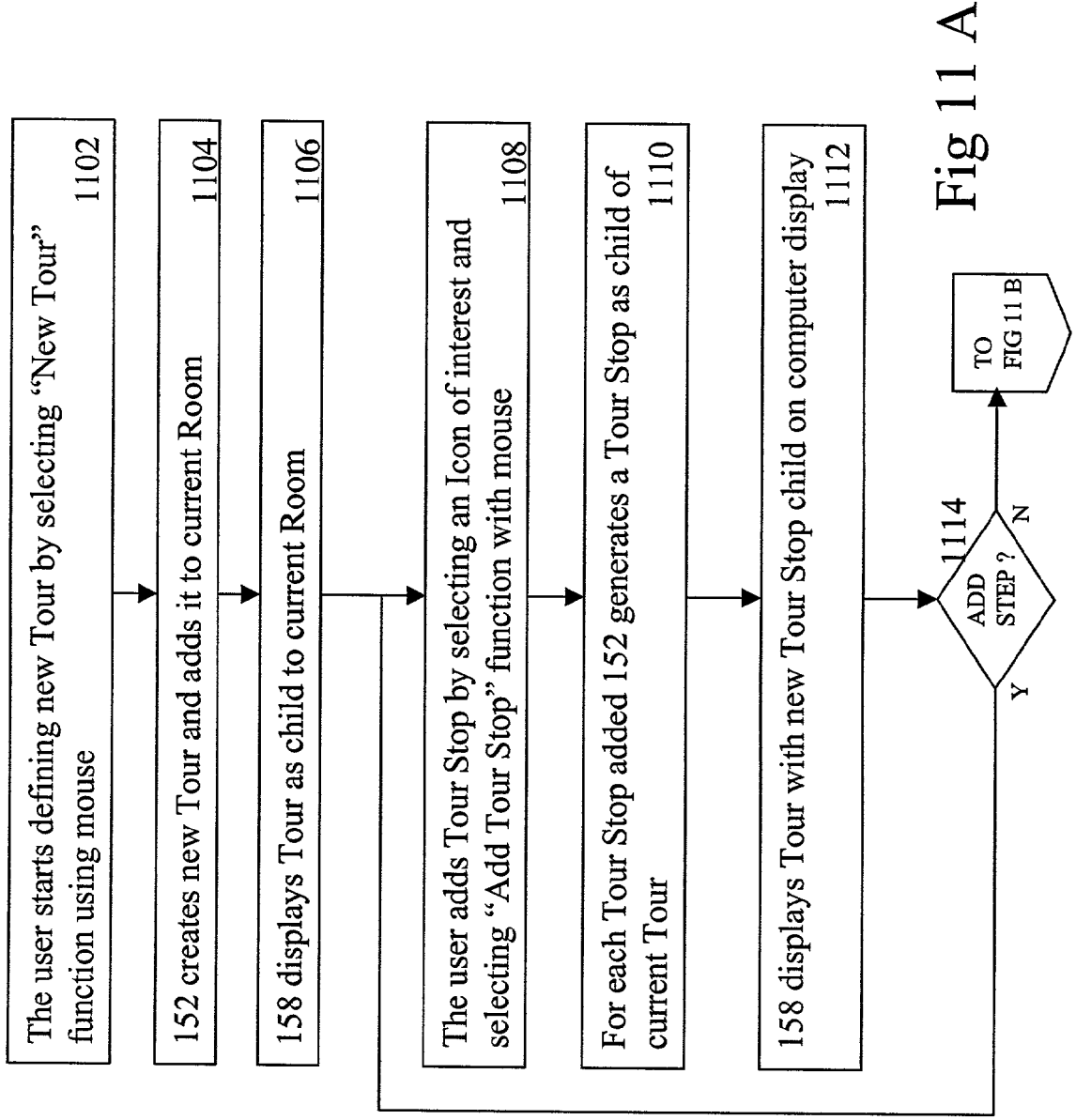
FIGS. 11A–11B, taken together, illustrate a manner in which a tour is defined (step 334 in FIG. 3B).
Figure 11:
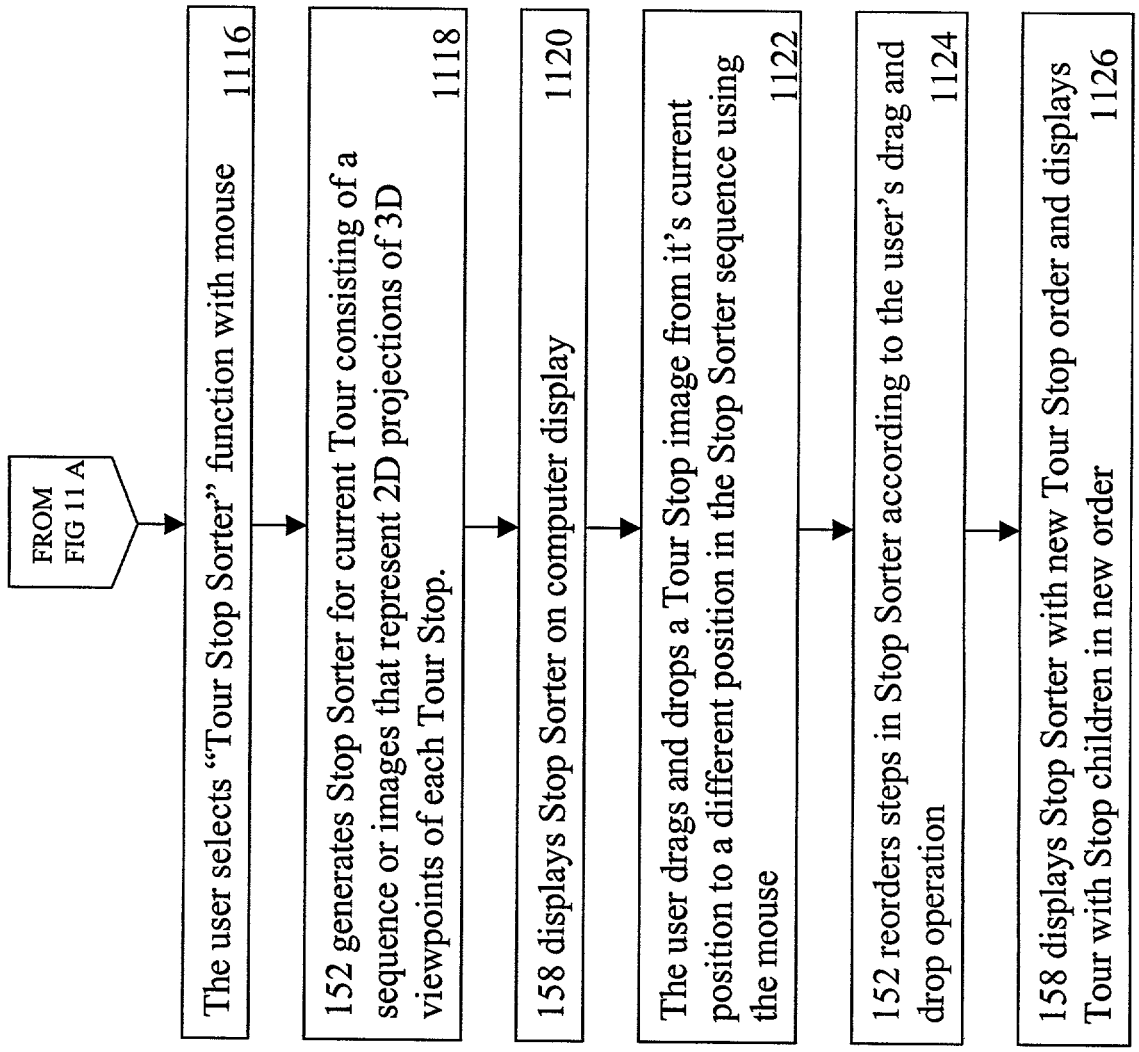

FIG. 11 illustrates an example embodiment of step 334, to define a tour. Broadly speaking, a tour is a defined (in at least some aspects) as navigation through a virtual room. At step 1102, the user selects the "new tour" function. At step 1104, the new tour is created and added to the current room. At step 1106, the tour is displayed as a child to the current room in the display description data store 108. At step 1108, the user adds the stops on the tour to the display description data store 108 by sequentially selecting various positions in the room from the three-dimensional rendering of the room. The positions in one embodiment are full vantage points (position and orientation) that are specified either explicitly (as a captured vantage point) or implicitly (as a reference to a data item on a wall). In the latter case, the vantage point is that which would be obtained by "flying-to" the data item as discussed previously. (Note that the actual position and orientation associated with these implicitly-defined "stops" will change if the data items are moved.)

At step 1110, the location of the tour stop is added to the display description data store 108 as a child to the tour. At step 1112, a representation of the tour is displayed with the new tour stops. At step 1114, it is determined whether an additional tour stop is to be added. At step 1116, the user selects the "tour stop sorter" function and, at step 1118, a sequence of two-dimensional images corresponding to the tour stops are generated. At step 1120, the two-dimensional images are displayed. Steps 1122, 1124 and 1126 allow for sorting of stops. At step 1122, the user drags a tour stop image to a different position in the stop sorter. At step 1124, the stops are reordered. At step 1126, the stop sorter displayed the stops with the new order. By presenting the user with a thumbnail image of each stop, the "stop sorter" makes it easier for a user to imagine the appearance of the tour as he edits its presentation order.

Figure 12:
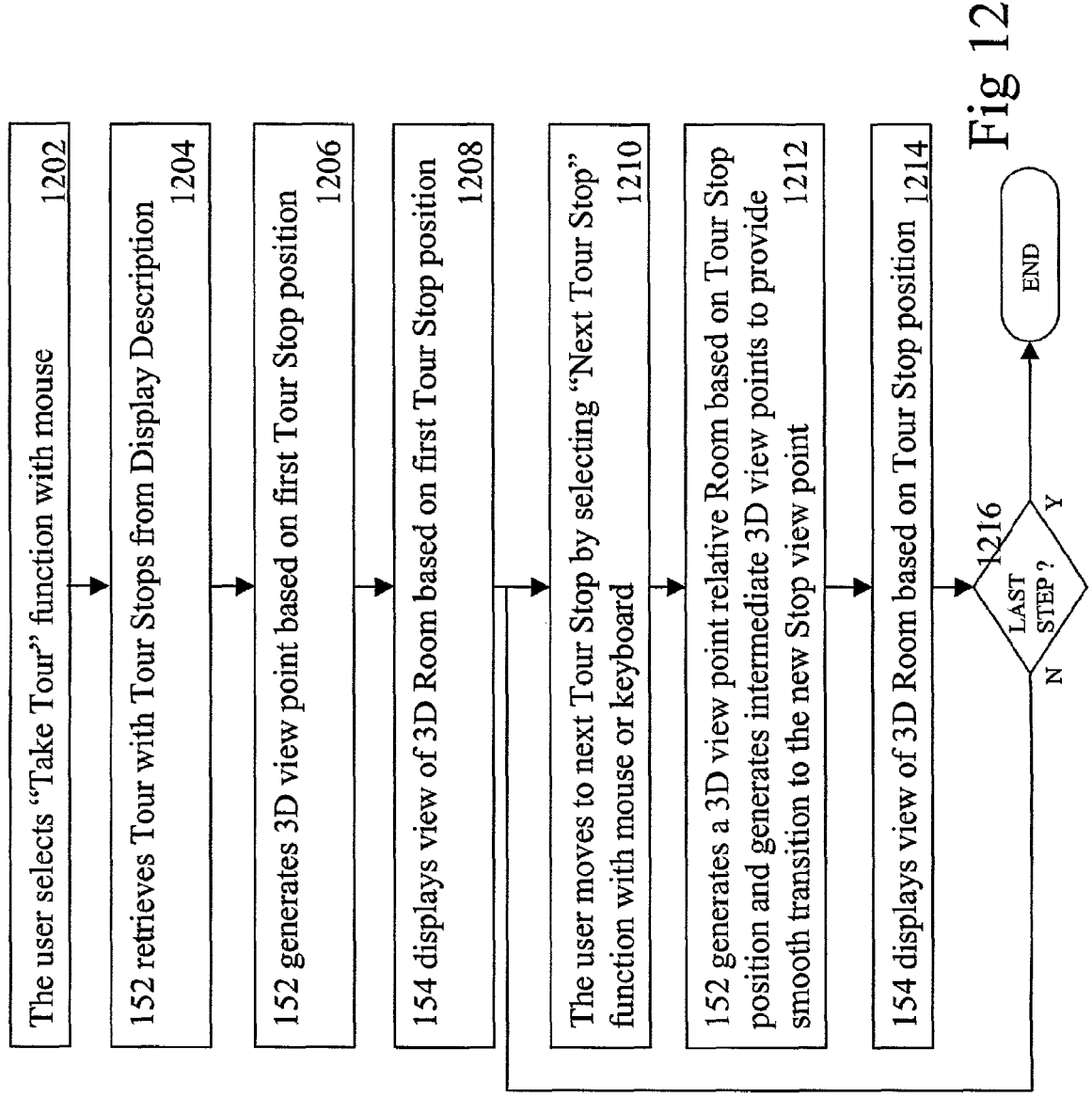
FIG. 12 is a simplified flowchart illustrating a manner in which a tour is "taken" (step 338 in FIG. 3B)

FIG. 12 illustrates an example embodiment of step 338 of FIG. 3, to "take" the tour. At step 1202, the user selects the "take tour" function. At step 1204, the tour stop definitions are retrieved from the display description data store 108 (FIG. 1). At step 1206, a definition of a three-dimensional image representing the host stop is generated based on the retrieved tour stop definition. At step 1208, the definition generated in step 1206 is rendered. At step 1210, the user selects the next tour stop. At step 1212, a definition of a three-dimensional image is generated for positions between the current tour stop and the next tour stop and the definitions are rendered. At step 1214, the definition of the three-dimensional image for the next tour stop is generated. At step 1216, it is determined if the last stop of the tour has been reached. If not, then processing returns to step 1210.

Additionally, each "stop" node of a "tour" includes properties that affect the behavior of the tour presentation when reaching that "stop". Each property can be edited by the user, changing the nature of the tour presentation. By default, a tour presentation waits for user input once a stop is reached before proceeding to the next stop. Alternatively, the user can choose to configure a stop to simply pause a tour at a stop for a specific duration. Additionally, if a "Stop" node includes a data reference to a product development data element, the user can indicate whether the referenced data should automatically be opened in the appropriate viewer when the stop is reached in the tour presentation.

Once a tour has been constructed, one or more users can interact with the virtual room in an automated fashion based on the defined tour stops. A user can "follow a tour" by selecting the appropriate "tour" node and choosing a "follow" action. The user is automatically taken "within" the appropriate virtual room (if not already within it) and is positioned at the vantage point captured by the first tour stop. The tour proceeds to the next stop after either the user has provided the appropriate input or the specified amount of time has elapsed (depending upon the configuration of the "stop" node). The user is automatically "led" to the vantage point of the next stop by interpolating the vantage points over a brief period of time. The user is therefore moved smoothly to the next stop, helping retain orientation within the virtual room.

Figure 13:
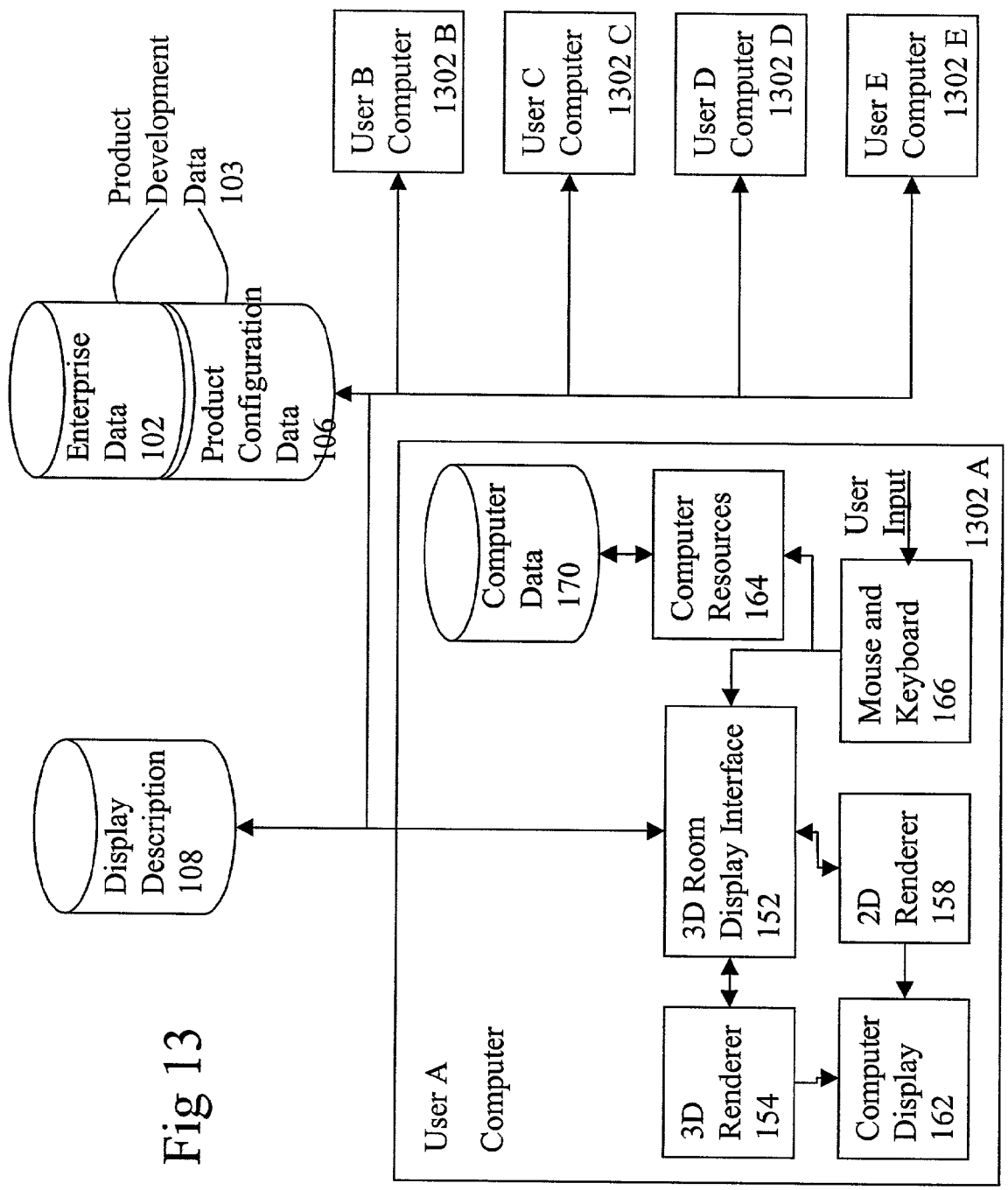
FIG. 13 illustrates how, in accordance with an embodiment, multiple users collaborate on a product development using a single virtual room. All users are shown observing the same product development data using the same virtual room, each using a different computer.

FIG. 13 illustrates how a plurality of users can collaborate on a product development project via a common virtual room interface. Unlike a physical war room, the virtual war room 112 is not geographically bound. Widely dispersed individuals can all access the same room, either separately or collaboratively. In particular, each of the user computers (in FIG. 13, five computers 1302a through 1302e are shown) may access the display description data store 108 so in addition to being able to define and/or follow his own tour, one user can allow his vantage point to be linked to that of another user via the display description data store 108, allowing the second user to direct the attention of the first user around the virtual room. The display description data 108 is not bound to the underlying content of the product development data 103, so users can share a common visualization of the product development data (such as in a physical war room) while having up-to-date access to the product development data 103.

What is claimed is:

1. A method of representing a product development to a plurality of users, wherein the product development comprises a collection of heterogeneous product development data elements manipulable by a plurality of heterogeneous application processes, the method comprising:

displaying to the plurality of users a rendered three-dimensional room including a plurality of walls, the displaying step including displaying iconic images on the walls, the iconic images corresponding to at least some of the product development elements with the visual organization of the displayed iconic images corresponding to a desired visual organization of the product development; and accepting selection input from the plurality of users to select the iconic images and providing an indication of the input to appropriate ones of the application processes to access and manipulate the product development elements to which the iconic images correspond.

2. The method of claim 1, wherein: the displaying step operates according to a desired room arrangement.

3. The method of claim 2, further comprising: receiving an indication of the desired arrangement from the users.

4. The method of claim 1, further comprising: receiving navigation indications from the users, wherein the displaying step displays the rendered three dimensional room with a viewpoint based at least in part on the navigation indications.

5. The method of claim 4, wherein: the navigation indications are indications of directions.

6. The method of claim 5, wherein: the navigation indications are indications of locations within the room.

7. The method of claim 1, and further comprising:

for at least one of the iconic images, displaying the iconic image for the product development elements based on an appearance of the product development element from within the associated application process.

8. The method of claim 4, wherein: the navigation indications are indications of a series of vantage points; and The displaying step includes sequentially displaying the rendered three-dimensional room with corresponding ones of the series of vantage points.

9. The method of claim 8, and further comprising: storing the indications of the series of vantage points.

10. The method of claim 9, and further comprising: receiving an indication of a desired change to the stored indication of the series of vantage points; and modifying the stored indications of the series of vantage points based on the received indication.

11. The method of claim 10, further comprising: displaying representations of The vantage points, wherein the received indication is relative to the displayed representations of the vantage points.

12. The method of claim 1, wherein: the three-dimensional room is a first three-dimensional room; and the displaying step includes displaying an iconic representation of a portal to a second three-dimensional room which, when selected by a user, causes the second three-dimensional room to be displayed in the displaying step.

13. The method of claim 1, wherein: the displaying step includes, for at least some of the iconic images, displaying property information of the product development element represented by the iconic image.

14. A method of facilitating collaboration in product development by a plurality of users, wherein the product development comprises a collection of heterogeneous product development data element accessible and manipulable by a plurality of heterogeneous application processes, the method comprising:

displaying to the plurality of users a rendered three-dimensional room including a plurality of walls, the displaying step including displaying iconic images on the walls, the iconic images corresponding to at least some of the product development elements with the visual organization of the displayed iconic images corresponding to a desired visual organization of the product development; and accepting selection input from the plurality of users to select the iconic images and providing an indication of the input to appropriate ones of the heterogeneous application processes to access and manipulate, by the heterogeneous application processes, the product development elements to which the iconic images correspond.

* * * * *